(12) United States Patent
Huang et al.

(10) Patent No.: US 11,184,214 B2
(45) Date of Patent: Nov. 23, 2021

(54) DEVICE AND METHOD OF PERFORMING SIGNAL COMPENSATION

(71) Applicant: Realtek Semiconductor Corp., HsinChu (TW)

(72) Inventors: Ming-Chung Huang, Taichung (TW); Yuan-Shuo Chang, Hsinchu (TW); Tzu-Ming Kao, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/732,361

(22) Filed: Jan. 2, 2020

(65) Prior Publication Data

US 2020/0403842 A1    Dec. 24, 2020

(30) Foreign Application Priority Data

Jun. 18, 2019   (TW) ................. 108121088

(51) Int. Cl.
*H04L 27/00*    (2006.01)
*H04L 27/38*    (2006.01)

(52) U.S. Cl.
CPC ...... *H04L 27/3863* (2013.01); *H04L 27/0014* (2013.01)

(58) Field of Classification Search
CPC .............. H04L 7/3863; H04L 7/0014
USPC .......................................... 375/350
See application file for complete search history.

(56) References Cited

U.S. PATENT DOCUMENTS

| 2003/0072393 | A1* | 4/2003  | Gu ..................... H04L 27/364 375/322 |
| 2004/0224656 | A1* | 11/2004 | Mimura ............... H04B 1/7174 455/275 |
| 2007/0058755 | A1* | 3/2007  | Husted ................ H04L 27/3863 375/332 |
| 2010/0232490 | A1* | 9/2010  | Balakrishnan ......... H03D 3/009 375/227 |
| 2012/0177151 | A1  | 7/2012  | Hormis |
| 2014/0307768 | A1* | 10/2014 | Gotman .............. H04L 27/2636 375/232 |

* cited by examiner

*Primary Examiner* — Ted M Wang
(74) *Attorney, Agent, or Firm* — Winston Hsu (57) ABSTRACT

A signal compensation device comprises a first filter circuit, for processing a broadband signal, to generate a first analog time-domain signal; a second filter circuit, for processing the broadband signal, to generate a second analog time-domain signal; a first transform circuit, for transforming the first analog time-domain signal to a first digital time-domain signal; a second transform circuit, for transforming the second analog time-domain signal to a second digital time-domain signal; a third transform circuit, for transforming the first digital time-domain signal to a first frequency-domain signal; a fourth transform circuit, for transforming the second digital time-domain signal to a second frequency-domain signal; and a processing circuit, for generating a time-domain compensation response according to the first frequency-domain signal and the second frequency-domain signal.

6 Claims, 8 Drawing Sheets

DEVICE AND METHOD OF PERFORMING SIGNAL COMPENSATION

BACKGROUND OF THE INVENTION

1. Field of the Invention

The present invention relates to a device and a method used in a communication system, and more particularly, to a device and a method of performing signal compensation.

2. Description of the Prior Art

In a communication device of a wireless communication device, a difference between responses on an in-phase signal path and a quadrature-phase signal path causes an IQ imbalance of signals on the signal paths. In the prior art, the communication device may use a narrowband signal to compensate the signal (s) on the in-phase signal path or the quadrature-phase signal, to eliminate the IQ imbalance at one frequency point. However, the communication device needs to perform the above operation a plurality of times to eliminate the IQ imbalance at different frequency points, and operation efficiency of the communication device degrades. Thus, how to improve efficiency of the signal compensation is an important problem to be solved.

SUMMARY OF THE INVENTION

The present invention therefore provides a communication device and method of performing signal compensation to solve the abovementioned problem.

A signal compensation device comprises a first filter circuit, for processing a broadband signal, to generate a first analog time-domain signal; a second filter circuit, for processing the broadband signal, to generate a second analog time-domain signal; a first transform circuit, coupled to the first filter circuit, for transforming the first analog time-domain signal to a first digital time-domain signal; a second transform circuit, coupled to the second filter circuit, for transforming the second analog time-domain signal to a second digital time-domain signal; a third transform circuit, coupled to the first transform circuit, for transforming the first digital time-domain signal to a first frequency-domain signal; a fourth transform circuit, coupled to the second transform circuit, for transforming the second digital time-domain signal to a second frequency-domain signal; and a processing circuit, coupled to the third transform circuit and the fourth transform circuit, for generating a time-domain compensation response according to the first frequency-domain signal and the second frequency-domain signal.

A signal compensation device comprises a first filter circuit, for processing a input signal, to generate a first analog signal; a second filter circuit, for processing the input signal, to generate a second analog signal; a first transform circuit, coupled to the first filter circuit, for transforming the first analog signal to a first digital signal; a second transform circuit, coupled to the second filter circuit, for transforming the second analog signal to a second digital signal; and a compensation circuit, coupled to the first transform circuit, for compensating the first digital signal according to a compensation response, to generate a compensation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
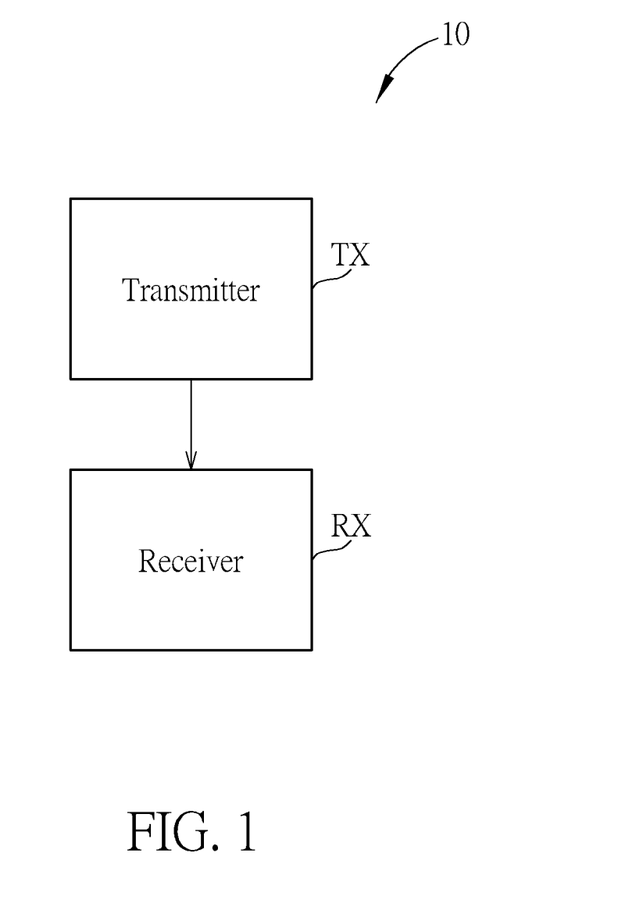
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system, a Long Term Evolution-advanced (LTE-A) system or a 5th generation (5G) system. In addition, the transmitter TX and the receiver RX may be installed in a mobile phone, a laptop, etc., but are not limited herein.

Figure 2:
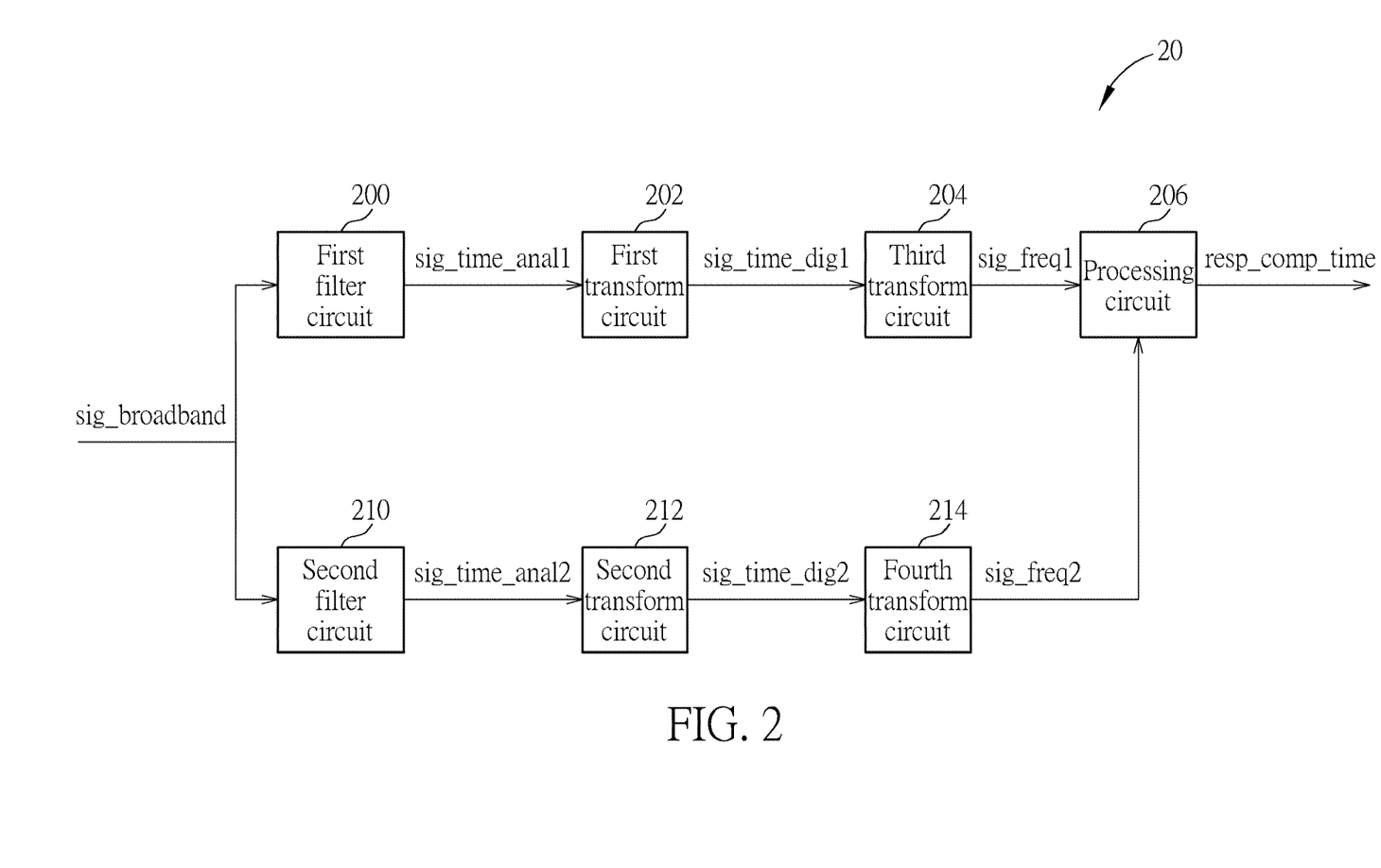
FIG. 2 is a schematic diagram of a signal compensation device according to an example of the present invention.

FIG. 2 is a schematic diagram of a signal compensation device 20 according to an example of the present invention. The signal compensation device 20 may be utilized in the transmitter TX or the receiver RX of FIG. 1, for generating a compensation response, to eliminate the IQ imbalance (or the IQ mismatch). The signal compensation device 20 includes a first filter circuit 200, a second filter circuit 210, a first transform circuit 202, a second transform circuit 212, a third transform circuit 204, a fourth transform circuit 214 and a processing circuit 206. In detail, the first filter circuit 200 processes a broadband signal sig_broadband, to generate a first analog time-domain signal sig_time_anal1. The second filter circuit 210 processes the broadband signal sig_broadband, to generate a second analog time-domain signal sig_time_anal2. The first transform circuit 202 is coupled to the first filter circuit 200, for transforming the first analog time-domain signal sig_time_anal1 to a first digital time-domain signal sig_time_dig1. The second transform circuit 212 is coupled to the second filter circuit 210, for transforming the second analog time-domain signal sig_time_anal2 to a second digital time-domain signal sig_time_dig2. The third transform circuit 204 is coupled to the first transform circuit 202, for transforming the first digital time-domain signal sig_time_dig1 to a first frequency-domain signal sig_freq1. The fourth transform circuit 214 is coupled to the second transform circuit 212, for transforming the second digital time-domain signal sig_time_dig2 to a second frequency-domain signal sig_freq2. The processing circuit 206 is coupled to the third transform circuit 204 and the fourth transform circuit 214, for generating a time-domain compensation response resp_comp_time according to the first frequency-domain signal sig_freq1 and the second frequency-domain signal sig_freq2.

In one example, the first analog time-domain signal sig_time_anal1, the first digital time-domain signal sig_time_dig1 and the first frequency-domain signal sig_freq1 are signals on an in-phase signal path, and the second analog time-domain signal sig_time_anal2, the second digital time-domain signal sig_time_dig2 and the second frequency-domain signal sig_freq2 are signals on a quadrature-phase signal path. In one example, the first analog time-domain signal sig_time_anal1, the first digital time-domain signal sig_time_dig1 and the first frequency-domain signal sig_freq1 are signals on the quadrature-phase signal path, and the second analog time-domain signal sig_time_anal2, the second digital time-domain signal sig_time_dig2 and the second frequency-domain signal sig_freq2 are signals on the in-phase signal path.

Figure 3:
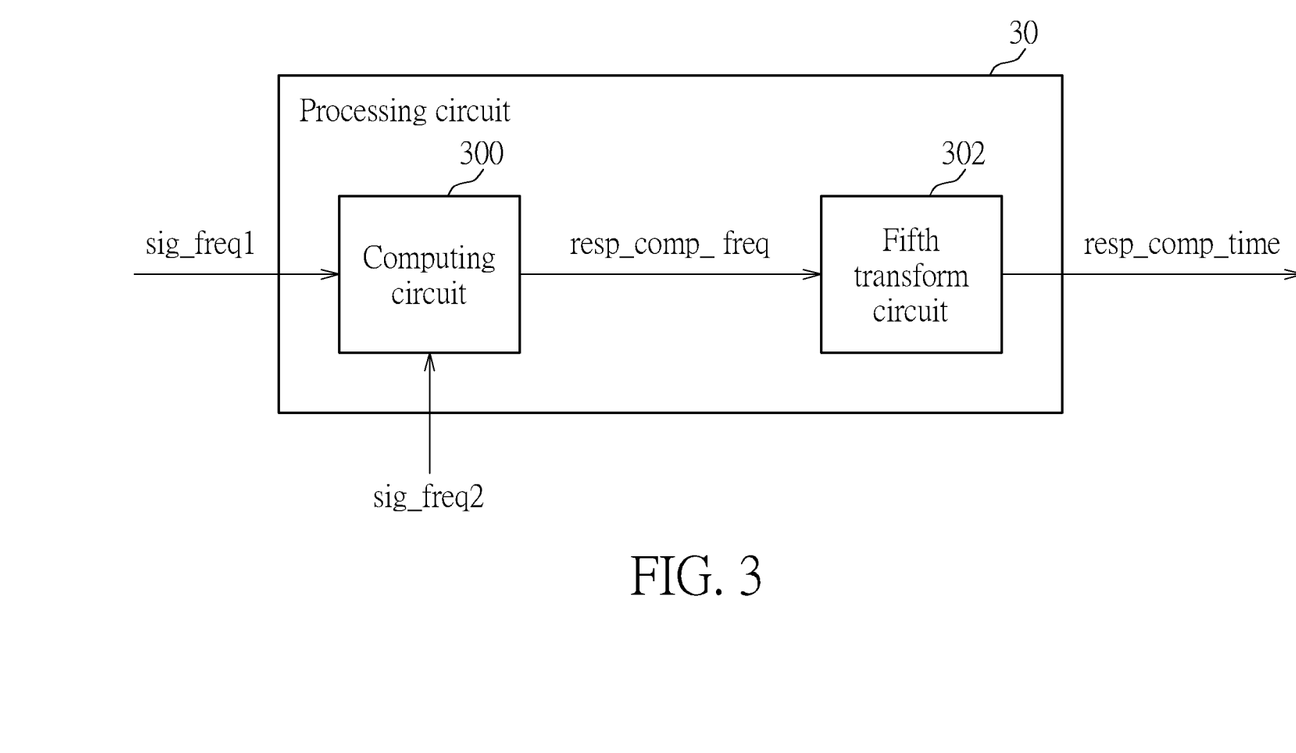
FIG. 3 is a schematic diagram of a processing circuit according to an example of the present invention.

FIG. 3 is a schematic diagram of a processing circuit 30 according to an example of the present invention. The processing circuit 30 may be used for realizing the processing circuit 206 of FIG. 2, but is not limited herein. The processing circuit 30 includes a computing circuit 300 and a fifth transform circuit 302. The computing circuit 300 is coupled to the third transform circuit 204 and the fourth transform circuit 214, for generating a frequency-domain compensation response resp_comp_freq according to the first frequency-domain signal sig_freq1 and the second frequency-domain signal sig_freq2. The fifth transform circuit 302 is coupled to the computing circuit 300, for transforming the frequency-domain compensation response resp_comp_freq to the time-domain compensation response resp_comp_time. In one example, the frequency-domain compensation response resp_comp_freq is related to a difference between the first frequency-domain signal sig_freq1 and the second frequency-domain signal sig_freq2. The difference may include a magnitude response difference and/or a phase response difference, but is not limited herein.

Figure 4:
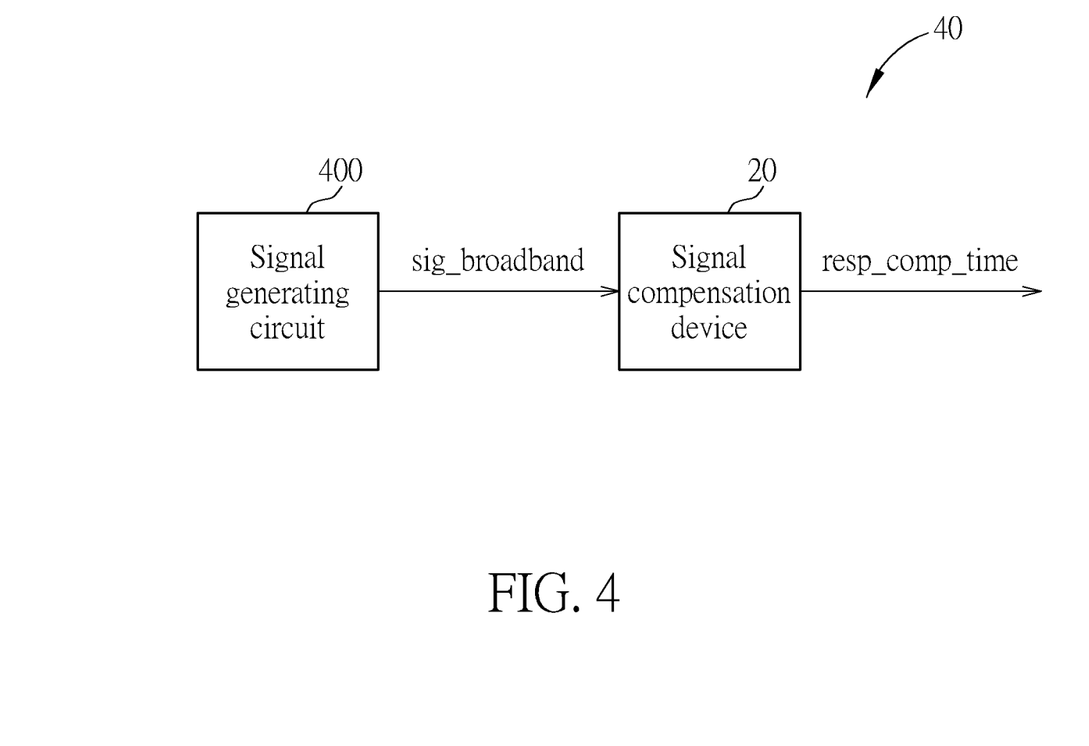
FIG. 4 is a schematic diagram of a signal compensation device according to an example of the present invention.

FIG. 4 is a schematic diagram of a signal compensation device 40 according to an example of the present invention. The signal compensation device 40 may be utilized in the transmitter TX or the receiver RX of FIG. 1. The signal compensation device 40 includes a signal generating circuit 400 and the signal compensation device 20. In detail, the signal generating circuit 400 is coupled to the signal compensation device 20 (e.g., the first filter circuit 200 and the second filter circuit 210), for generating the broadband signal sig_broadband. The signal compensation device 20 uses the broadband signal sig_broadband to generate the time-domain compensation response resp_comp_time. The operations of the signal compensation device 20 can be referred to the previous description, and are not narrated herein.

In one example, the broadband signal sig_broadband is an impulse signal. That is, the impulse signal is used as an input signal (or a testing signal). In addition, after a Fast Fourier Transform (FFT) is performed, the impulse signal is a constant in the frequency spectrum. In other words, the impulse signal has the same energy at each frequency point. In one example, the first filter circuit 200 and the second filter circuit 210 are analog baseband filters. In one example, the first transform circuit 202 and the second transform circuit 212 are analog-to-digital converters (ADCs). In one example, the third transform circuit 204 and the fourth transform circuit 214 perform the FFT, to transform the first digital time-domain signal sig_time_dig1 and the second digital time-domain signal sig_time_dig2 to the first frequency-domain signal sig_freq1 and the second frequency-domain signal sig_freq2, respectively.

Figure 5:
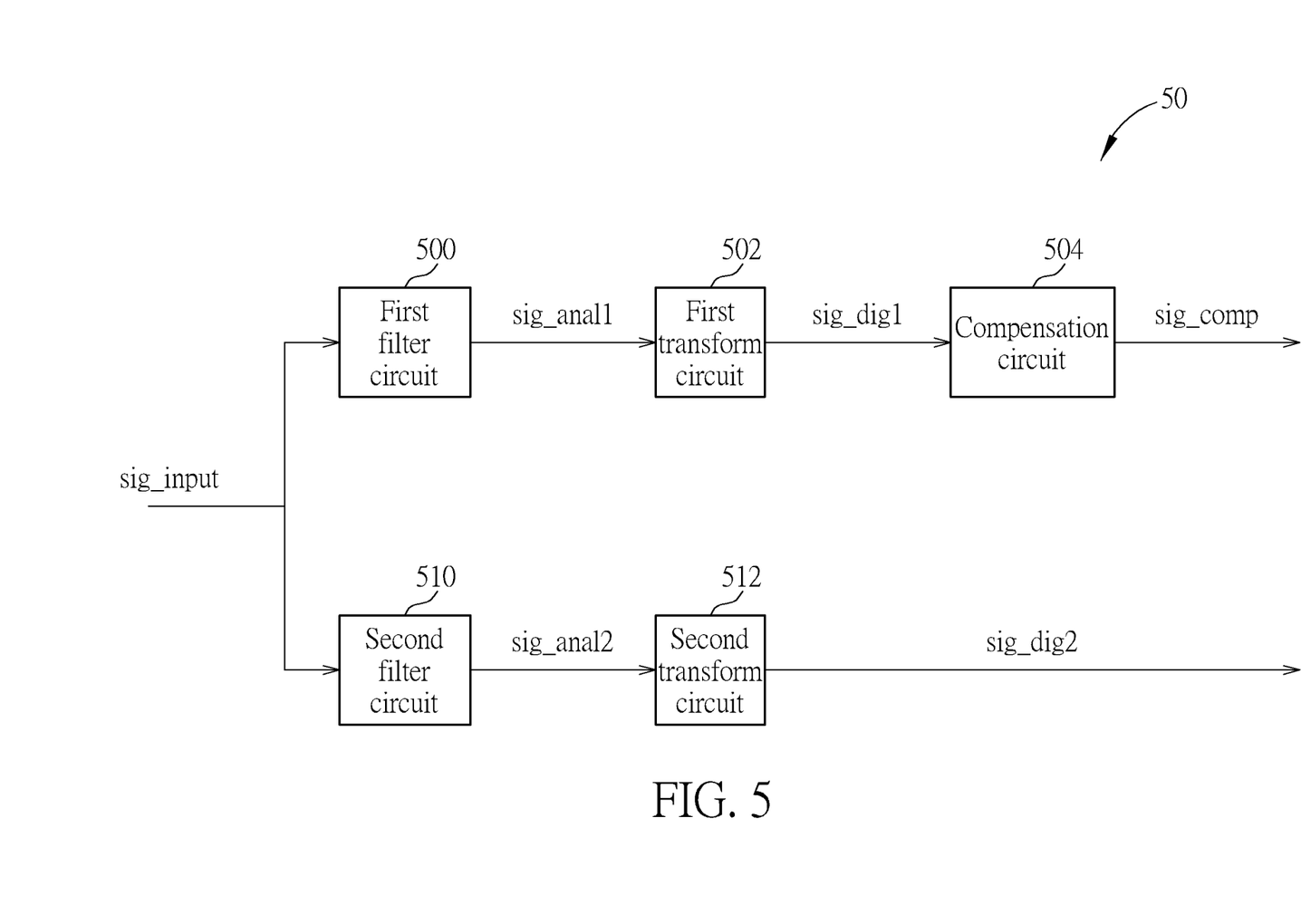
FIG. 5 is a schematic diagram of a signal compensation device according to an example of the present invention.

FIG. 5 is a schematic diagram of a signal compensation device 50 according to an example of the present invention. The signal compensation device 50 may be utilized in the transmitter TX or the receiver RX of FIG. 1, for eliminating the IQ imbalance (or the IQ mismatch). The signal compensation device 50 includes a first filter circuit 500 (e.g., the first filter circuit 200), a second filter circuit 510 (e.g., the second filter circuit 210), a first transform circuit 502 (e.g., the first transform circuit 202), a second transform circuit 512 (e.g., the second transform circuit 212) and a compensation circuit 504. In detail, the first filter circuit 500 is for processing an input signal sig_input, to generate a first analog signal sig_anal1. The second filter circuit 510 is for processing the input signal, to generate a second analog signal sig_anal2. The first transform circuit 502 is coupled to the first filter circuit 500, for transforming the first analog signal sig_anal1 to a first digital signal sig_dig1. The second transform circuit 512 coupled to the second filter circuit, for transforming the second analog signal sig_anal2 to a second digital signal sig_dig2. The compensation circuit 504 is coupled to the first transform circuit 502, for compensating the first digital signal sig_dig1 according to a compensation response, to generate a compensation signal sig_comp. That is, the compensation circuit 504 compensates the first digital signal sig_dig1 according to the compensation response, such that the responses on the in-phase signal path and the quadrature-phase signal path are the same. The IQ imbalance caused by the response different is eliminated.

In one example, the compensation circuit 504 is a digital baseband filter. In one example, the compensation response is the time-domain compensation response resp_comp_time generated by the signal compensation device 20. In one example, the first analog signal sig_anal1, the second analog signal sig_anal2, the first digital signal sig_dig1, the second digital signal sig_dig2 and the compensation signal sig_comp are time-domain signals.

In one example, the first analog signal sig_anal1, the first digital signal sig_dig1 and the compensation signal sig_comp are signals on the in-phase signal path, and the second analog signal sig_anal2 and the second digital signal sig_dig2 are signals on the quadrature-phase signal path. In one example, the first analog signal sig_anal1, the first digital signal sig_dig1 and the compensation signal sig_comp are signals on the quadrature-phase signal path, and the second analog signal sig_anal2 and the second digital signal sig_dig2 are signals on the in-phase signal path.

The following example is used for illustrating how the signal compensation devices 40 and 50 compensate the signal(s) on the in-phase signal path, to eliminate the IQ imbalance. First, the signal generating circuit 400 generates an impulse signal x(t) (i.e., the broadband signal sig_broadband). The first filter circuit 200 and the second filter circuit 210 generate time-domain signals $y_I(t)$ and $y_Q(t)$ (e.g., the first analog time-domain signal sig_time_anal1 and the second analog time-domain signal sig_time_anal2), respectively, according to the impulse signal x(t), as follows:

$$y_I(t) = h_I(x(t)) = \text{conv}(h_I(t), x(t)), \quad \text{(Eq. 1)}$$

$$y_Q(t) = h_Q(x(t)) = \text{conv}(h_Q(t), x(t)), \quad \text{(Eq. 2)}$$

wherein $h_I(t)$ and $h_Q(t)$ are impulse responses of the first filter circuit 200 and the second filter circuit 210, respectively, and conv( ) is a convolution function. Then, the third transform circuit 204 and the fourth transform circuit 214 transform the time-domain signals $y_I(t)$ and $y_Q(t)$ to frequency-domain signals $Y_I(\omega)$ and $Y_Q(\omega)$, respectively (e.g., the first frequency-domain signal sig_freq1 and the second frequency-domain signal sig_freq2), after the time-domain signals $y_I(t)$ and $y_Q(t)$ pass via ADCs. The frequency-domain signals $Y_I(\omega)$ and $Y_Q(\omega)$ can be expressed as following equations according to a convolution theory:

$$Y_I(\omega) = H_I(\omega) X(\omega), \quad \text{(Eq. 3)}$$

$$Y_Q(\omega) = H_Q(\omega) X(\omega), \quad \text{(Eq. 4)}$$

wherein $X(\omega)$ is the impulse signal $x(t)$ after the FFT is performed, and $H_I(\omega)$ and $H_Q(\omega)$ are frequency responses of the first filter circuit 200 and the second filter circuit 210, respectively. Due to that the impulse signal $X(\omega)$ is a constant, the equations (Eq. 3) and (Eq. 4) can be derived as follows:

$$H_I(\omega) \propto Y_I(\omega), \quad \text{(Eq. 5)}$$

$$H_Q(\omega) \propto Y_Q(\omega). \quad \text{(Eq. 6)}$$

Figure 6:
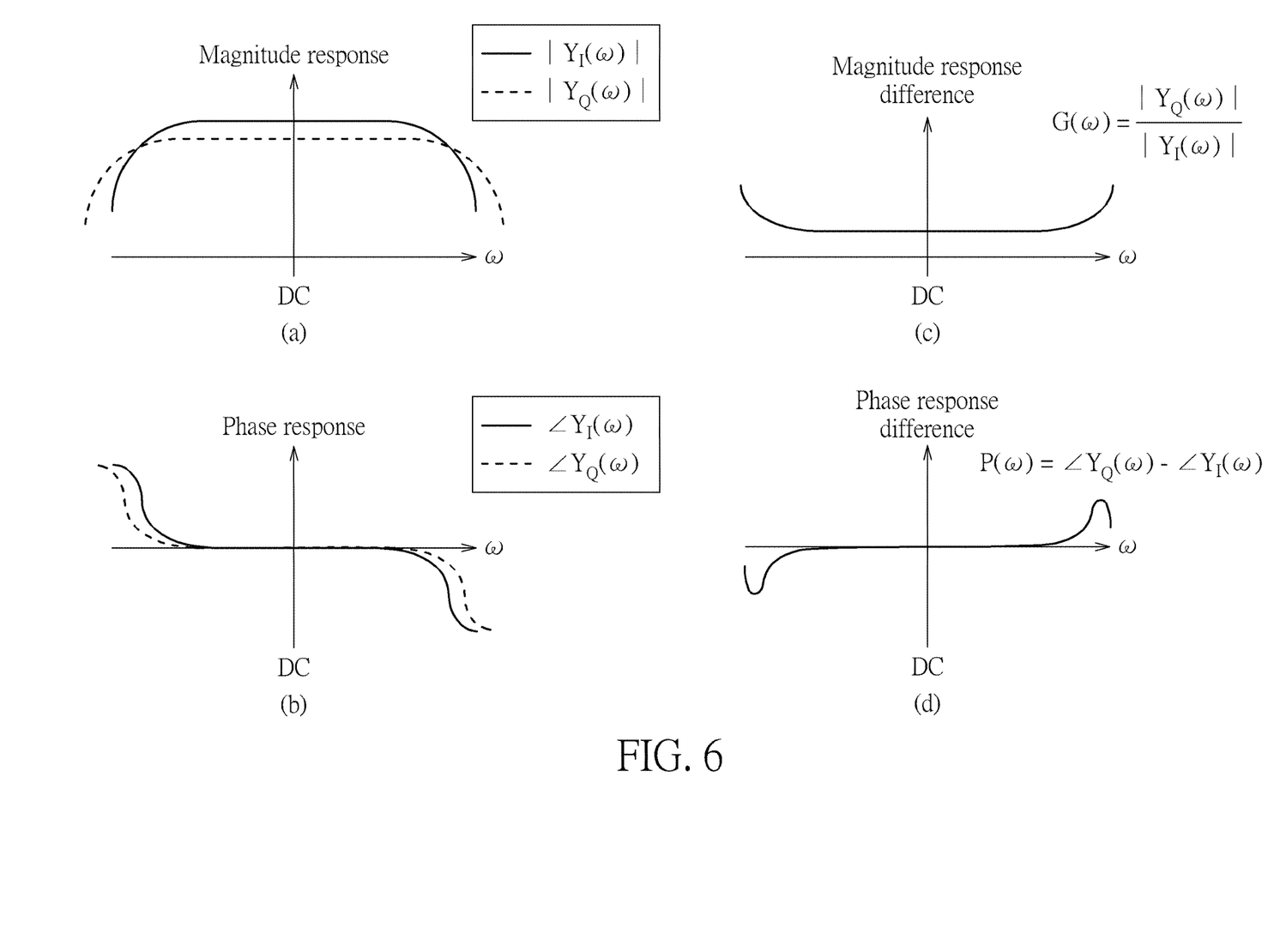
FIG. 6 is a schematic diagram of a plurality of frequency-domain signals according to an example of the present invention.

That is, the frequency response $H_I(\omega)$ is proportional to the frequency-domain signal $Y_I(\omega)$, and the frequency response $H_Q(\omega)$ is proportional to the frequency-domain signal $Y_Q(\omega)$. Thus, the computing circuit 300 may use the frequency-domain signals $Y_I(\omega)$ and $Y_Q(\omega)$ to compute a frequency compensation response H. According to the equations (Eq. 3) and (Eq. 4), the computing circuit 300 computes magnitude responses ($|Y_I(\omega)|$ and $|Y_Q(\omega)|$) and phase responses ($\angle Y_I(\omega)$ and $\angle Y_Q(\omega)$) of the frequency-domain signals $Y_I(\omega)$ and $Y_Q(\omega)$ as shown in subfigures (a) and (b) of FIG. 6. Thus, a magnitude response difference $G(\omega)$ and a phase response difference $P(\omega)$ can be obtained according to the following equations:

$$G(\omega) = \frac{|Y_Q(\omega)|}{|Y_I(\omega)|}, \quad \text{(Eq. 7)}$$

$$P(\omega) = \angle Y_Q(\omega) - \angle Y_I(\omega). \quad \text{(Eq. 8)}$$

In the equation (Eq. 7), the magnitude response $|Y_Q(\omega)|$ of the frequency-domain signal $Y_Q(w)$ is normalized according to the magnitude response $|Y_I(\omega)|$ of the frequency-domain signal $Y_I(\omega)$. Thus, a product of the magnitude response difference $G(\omega)$ and the magnitude response $|Y_I(\omega)|$ is the same as the magnitude response $|Y_Q(\omega)|$. In other words, the compensated magnitude response on the in-phase signal path is the same as the magnitude response on the quadrature-phase signal path. In addition, a sum of the phase response difference $P(\omega)$ and the phase response $\angle Y_I(\omega)$ is the same as the phase response $\angle Y_Q(\omega)$. The compensated phase response on the in-phase signal path is the same as the phase response on the quadrature-phase signal path. According to the equations (Eq. 7) and (Eq. 8), the computing circuit 300 computes a difference function $C(\omega)$ and the frequency compensation response H (e.g., the frequency-domain compensation response resp_comp_freq) as follows:

$$C(\omega) = G(\omega) \cdot \exp(i \cdot P(\omega)) = \frac{|Y_Q(\omega)|}{|Y_I(\omega)|} \cdot \exp(i \cdot (\angle Y_Q(\omega) - \angle Y_I(\omega))), \quad \text{(Eq. 9)}$$

$$H = \begin{bmatrix} C\left(-\frac{f_S}{2}\right) \\ C\left(-\frac{f_S}{2} + f_{step}\right) \\ C\left(-\frac{f_S}{2} + 2f_{step}\right) \\ \vdots \\ C(DC) \\ C(f_{step}) \\ \vdots \\ C\left(\frac{f_S}{2} - f_{step}\right) \end{bmatrix}, \quad \text{(Eq. 10)}$$

wherein $f_S$ is a sampling rate of the first transform circuit 202 and the second transform circuit 212, and $f_{step}$ is a frequency interval. In addition, the fifth transform circuit 302 may transform the frequency compensation response H to an impulse compensation response h[n] (e.g., the time-domain compensation response resp_comp_time) via an Inverse Discrete Fourier Transform (IDFT) as follows:

$$h[n] = IDFT(H) = \frac{1}{N} \sum_{k=0}^{N-1} \exp\left(\frac{i 2\pi n k}{N}\right) \times H[k], \quad \text{(Eq. 11)}$$

$$\text{wherein } N = \frac{f_S}{f_{step}}.$$

Then, the signal compensation device 50 generates a time-domain signal $k_I[n]$ (e.g., the first digital signal sig_dig1) according to an input signal via the first filter circuit 500 and the first transform circuit 502. The signal compensation device 50 generates a time-domain signal $k_Q[n]$ (e.g., the second digital signal sig_dig2) according to the input signal via the second filter circuit 510 and the second transform circuit 512. The compensation circuit 504 uses the impulse compensation response h[n] to compensate the time-domain signal $k_I[n]$ as follows:

$$k_I'[n] = \text{conv}(h[n], k_I[n]), \quad \text{(Eq. 12)}$$

wherein $k_I'[n]$ is a compensation result (e.g., the compensation signal sig_comp) of the time-domain signal $k_I[n]$. Thus, the responses (e.g., the magnitude responses and the phase responses) on the in-phase signal path and the quadrature-phase signal path are the same. The problem of the IQ imbalance can be solved.

FIG. 6 is a schematic diagram of a plurality of frequency-domain signals $Y_I(\omega)$ and $Y_Q(\omega)$ according to an example of the present invention. The subfigure (a) illustrates the magnitude responses of the frequency-domain signals $Y_I(\omega)$ and $Y_Q(\omega)$. The subfigure (b) illustrates the phase responses of the frequency-domain signals $Y_I(\omega)$ and $Y_Q(\omega)$. The subfigure (c) illustrates the magnitude response difference $G(\omega)$ (or termed as an IQ amplitude mismatch) of the frequency-domain signals $Y_I(\omega)$ and $Y_Q(\omega)$. The subfigure (d) illustrates the phase response difference $P(\omega)$ (or termed as an IQ phase mismatch) of the frequency-domain signals $Y_I(\omega)$ and $Y_Q(\omega)$. The computing circuit 300 computes the difference function $C(\omega)$ according to the subfigures (c) and (d), to obtain the frequency compensation response H. Operations of the computing circuit 300 can be referred to the previous description, and are not narrated herein.

Figure 7:
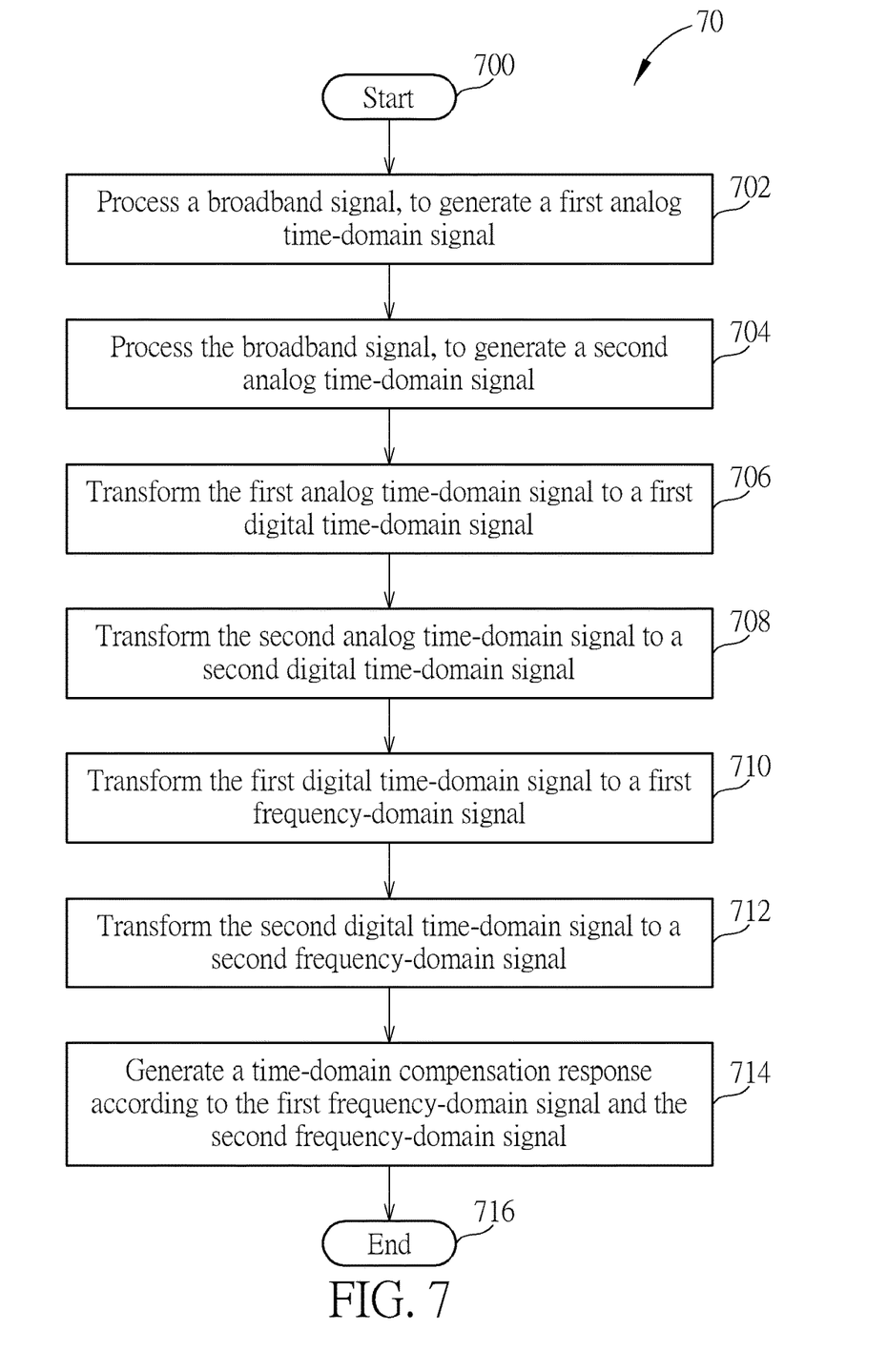
FIG. 7 is a flowchart of a process according to an example of the present invention.

Operations of the signal compensation device 20 in the above examples can be summarized into a process 70 shown in FIG. 7. The process 70 is utilized in the transmitter TX or the receiver RX, and includes the following steps:

Step 700: Start.

Step 702: Process a broadband signal, to generate a first analog time-domain signal.

Step 704: Process the broadband signal, to generate a second analog time-domain signal.

Step 706: Transform the first analog time-domain signal to a first digital time-domain signal.

Step 708: Transform the second analog time-domain signal to a second digital time-domain signal.

Step 710: Transform the first digital time-domain signal to a first frequency-domain signal.

Step 712: Transform the second digital time-domain signal to a second frequency-domain signal.

Step 714: Generate a time-domain compensation response according to the first frequency-domain signal and the second frequency-domain signal.

Step 716: End.

Figure 8:
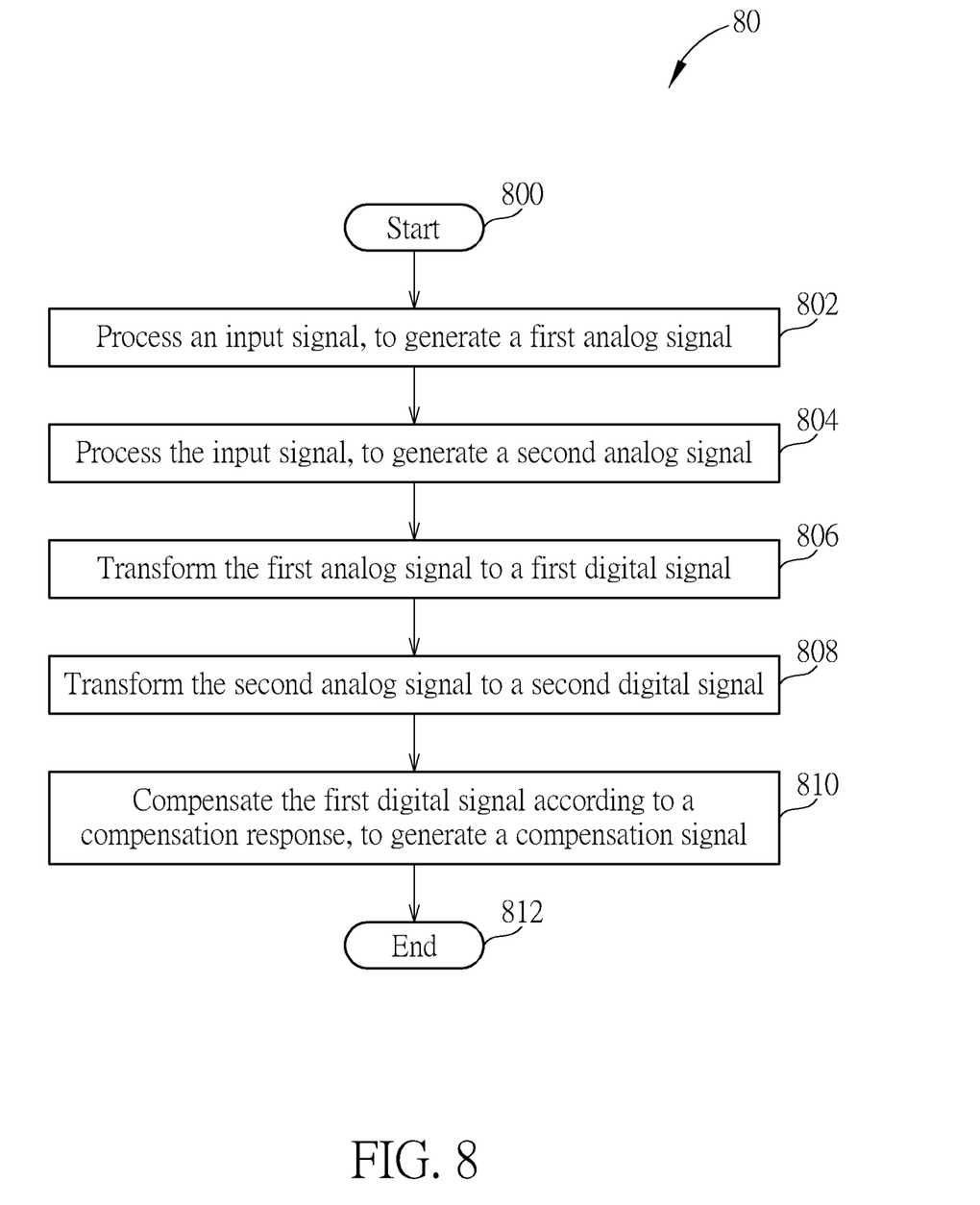
FIG. 8 is a flowchart of a process according to an example of the present invention.

Operations of the signal compensation device 50 in the above examples can be summarized into a process 80 shown in FIG. 8. The process 80 is utilized in the transmitter TX or the receiver RX, and includes the following steps:

Step 800: Start.

Step 802: Process an input signal, to generate a first analog signal.

Step 804: Process the input signal, to generate a second analog signal.

Step 806: Transform the first analog signal to a first digital signal.

Step 808: Transform the second analog signal to a second digital signal.

Step 810: Compensate the first digital signal according to a compensation response, to generate a compensation signal.

Step 812: End.

The processes 70 and 80 are used for illustrating the operations of the signal compensation devices 20 and 50, respectively. Detailed description and variations of the processes 70 and 80 can be referred to the previous description, and are not narrated herein.

It should be noted that realizations of the signal compensation devices 20, 40 and 50 (including the first filter circuits 200 and 500, the second filter circuits 210 and 510, the first transform circuits 202 and 502, the second transform circuits 212 and 512, the third transform circuit 204, the fourth transform circuit 214, the processing circuit 206, the signal generating circuit 400 and the compensation circuit 504) are various. For example, the devices (circuits) mentioned above may be integrated into one or more devices (circuits). In addition, the signal compensation devices 20, 40 and 50 may be realized by hardware (e.g., circuit), software, firmware (known as a combination of a hardware device, computer instructions and data that reside as read-only software on the hardware device), an electronic system or a combination of the devices mentioned above, but are not limited herein.

To sum up, the present invention provides a device and a method of performing signal compensation. The signal compensation device uses the broadband signal to obtain the compensation response, and compensates the signal(s) on the in-phase signal path or the quadrature-phase signal path according to the compensation response, to eliminate the IQ imbalance at the plurality of frequency points. The present invention provides a better performance than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal compensation device comprising:
a first filter circuit, for processing a broadband signal, to generate a first analog time-domain signal;
a second filter circuit, for processing the broadband signal, to generate a second analog time-domain signal;
a first transform circuit, coupled to the first filter circuit, for transforming the first analog time-domain signal to a first digital time-domain signal;
a second transform circuit, coupled to the second filter circuit, for transforming the second analog time-domain signal to a second digital time-domain signal;
a third transform circuit, coupled to the first transform circuit, for transforming the first digital time-domain signal to a first frequency-domain signal;
a fourth transform circuit, coupled to the second transform circuit, for transforming the second digital time-domain signal to a second frequency-domain signal; and
a processing circuit, coupled to the third transform circuit and the fourth transform circuit, for generating a time-domain compensation response according to the first frequency-domain signal and the second frequency-domain signal, wherein the time-domain compensation response is for compensating the first digital time-domain signal;
wherein the processing circuit comprising:
a computing circuit, coupled to the third transform circuit and the fourth transform circuit, for generating a frequency-domain compensation response according to the first frequency-domain signal and the second frequency-domain signal; and
a fifth transform circuit, coupled to the computing circuit, for transforming the frequency-domain compensation response to the time-domain compensation response;
wherein the frequency-domain compensation response is defined according to the following equation:

$$H = \begin{bmatrix} C\left(-\frac{f_S}{2}\right) \\ C\left(-\frac{f_S}{2} + f_{step}\right) \\ C\left(-\frac{f_S}{2} + 2f_{step}\right) \\ \vdots \\ C(DC) \\ C(f_{step}) \\ \vdots \\ C\left(\frac{f_S}{2} - f_{step}\right) \end{bmatrix},$$

wherein $C(\omega)$ is a difference function related to the first frequency-domain signal and the second frequency-domain signal, $f_S$ is a sampling rate of the first transform circuit and the second transform circuit, and $f_{step}$ is a frequency interval.

2. The signal compensation device of claim 1, further comprising:
a signal generating circuit, coupled to the first filter circuit and the second filter circuit, for generating the broadband signal.

3. The signal compensation device of claim 1, wherein the broadband signal is an impulse signal.

4. The signal compensation device of claim 1, wherein the first filter circuit and the second filter circuit are analog baseband filters.

5. The signal compensation device of claim 1, wherein the first transform circuit and the second transform circuit are analog-to-digital converters (ADCs).

6. The signal compensation device of claim 1, wherein the third transform circuit and the fourth transform circuit perform a Fast Fourier Transform (FFT), to transform the first digital time-domain signal and the second digital time-domain signal to the first frequency-domain signal and the second frequency-domain signal, respectively.

* * * * *